(12) United States Patent
Chen et al.

(10) Patent No.: US 8,464,132 B2
(45) Date of Patent: Jun. 11, 2013

(54) METHOD FOR ACCESSING FLASH MEMORY AND ASSOCIATED MEMORY DEVICE

(75) Inventors: Po-Syuan Chen, Yunlin County (TW); Chi-Hsiang Hung, Taipei (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 499 days.

(21) Appl. No.: 12/772,995

(22) Filed: May 3, 2010

(65) Prior Publication Data

US 2011/0066877 A1    Mar. 17, 2011

(30) Foreign Application Priority Data

Sep. 4, 2009    (TW) ................................. 98129827 A

(51) Int. Cl.
*G11C 29/00* (2006.01)
(52) U.S. Cl.
USPC ............... 714/763; 714/6.1; 714/14; 714/773
(58) Field of Classification Search
USPC ..................... 714/763, 6.1, 14, 773
See application file for complete search history.

(56) References Cited

U.S. PATENT DOCUMENTS

| | | | | |
|---|---|---|---|---|
| 5,963,983 | A * | 10/1999 | Sakakura et al. | 711/202 |
| 7,797,479 | B2 * | 9/2010 | Trika et al. | 711/103 |
| 7,941,692 | B2 * | 5/2011 | Royer et al. | 714/6.1 |
| 2007/0005928 | A1 * | 1/2007 | Trika et al. | 711/202 |
| 2007/0083697 | A1 * | 4/2007 | Birrell et al. | 711/103 |
| 2009/0172466 | A1 * | 7/2009 | Royer et al. | 714/6 |
| 2009/0327624 | A1 * | 12/2009 | Tamura et al. | 711/158 |
| 2009/0327759 | A1 * | 12/2009 | Royer et al. | 713/193 |

FOREIGN PATENT DOCUMENTS

CN    1518000 A    8/2004

* cited by examiner

*Primary Examiner* — Charles Ehne
(74) *Attorney, Agent, or Firm* — Winston Hsu; Scott Margo

(57) ABSTRACT

A method for accessing a flash memory includes: writing a data stream into at least a page of at least one data block of the flash memory, where each page of the data block includes an identity code; reading at least one identity code of the page; and determining a specific page according to at least the identity code, where the specific page is a last page that the data stream is written to before the flash memory is disconnected from a power source.

20 Claims, 6 Drawing Sheets

METHOD FOR ACCESSING FLASH MEMORY AND ASSOCIATED MEMORY DEVICE

BACKGROUND OF THE INVENTION

1. Field of the Invention

The present invention relates to a flash memory, and more particularly, to a method for accessing a flash memory and an associated memory device.

2. Description of the Prior Art

As flash memory technology progresses, many kinds of portable memory devices, such as memory cards respectively complying with SD/MMC, CF, MS, and XD standards, can be widely implemented in various applications. Therefore, the control of access to flash memories in these portable memory devices has become an important issue.

Please refer to FIG. 1. FIG. 1 is a diagram illustrating a memory controller writing updated data into a data block 100 of a flash memory. As shown in FIG. 1, the memory controller sequentially writes the updated data from a host device (e.g., a personal computer) into pages P1, P2, P3, P4, ..., etc. of the data block 100. If the memory controller is disconnected from the power when writing the data into page P4, the data written into the page P4 will be incomplete. When the memory controller is re-connected to the power, the memory controller will sequentially read the data of the data block 100 from the last page Pn (at this time, the pages P5-Pn are empty). If a reading error occurs when reading the data of page P4 (the error data stored in the page P4 cannot be corrected by using its corresponding error correction code), the memory controller will determine that the power was suddenly shut down during the time the data was written into the page P4, and the data stored in page P4 will be discarded; if no reading error occurs when reading the data of the page P4 (the error data stored in the page P4 can be corrected by using its corresponding error correction code), the memory controller will determine that the data stored in the page P4 is complete and correct.

However, when the power is suddenly shut down during the process of data being written into page P4, levels of memory units of the page are unstable. That is, the aforementioned determination that "data written into page P4 will be incomplete" includes an obvious data error or a vague data error. If the page P4 has this vague data error, generally the data read from the page P4 is correct, however, in the situation that the memory controller has great power consumption (e.g., a large amount of data is written or read), the data read from the page P4 may be incorrect (i.e., data reading error). In other words, if the page P4 has the vague data error, sometimes the data read from the page P4 is correct and sometimes the data read from the page P4 is incorrect. Therefore, even if the memory controller determines that the data stored in the page P4 is complete and correct after the memory controller is re-connected with the power, a reading error may still occur when reading the data stored in page P4 at a later time, causing inconvenience and trouble to a user.

SUMMARY OF THE INVENTION

It is therefore an objective of the present invention to provide a method for accessing a flash memory and an associated memory device, to solve the above-mentioned problems.

According to one embodiment of the present invention, a method for accessing a flash memory includes: writing a data stream into at least a page of at least one data block of the flash memory, where each page of the data block includes an identity code; reading at least one identity code of the page; and determining a specific page according to at least the identity code, where the specific page is a last page that the data stream is written to before the flash memory is disconnected from a power source.

According to another embodiment of the present invention, a memory device includes a flash memory and a controller. The controller is utilized for writing a data stream into at least a page of at least one data block of the flash memory, where each page of the data block includes an identity code. The controller reads at least one identity code of the page, and determines a specific page according to at least the identity code, where the specific page is a last page that the data stream is written to before the flash memory is disconnected from a power source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
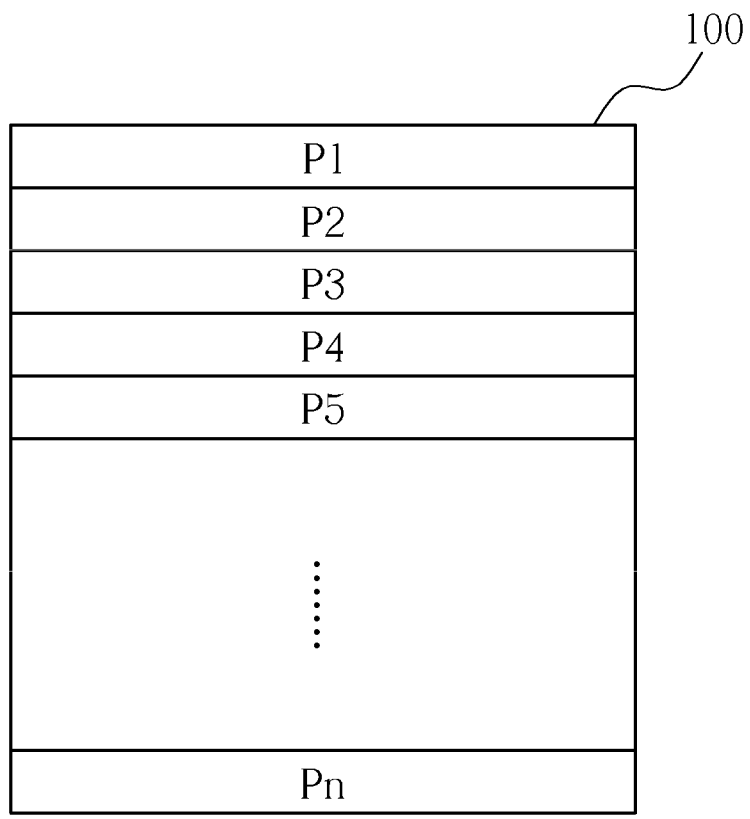
FIG. 1 is a diagram illustrating a memory controller writing updated data into a data block of a flash memory.
Figure 2:
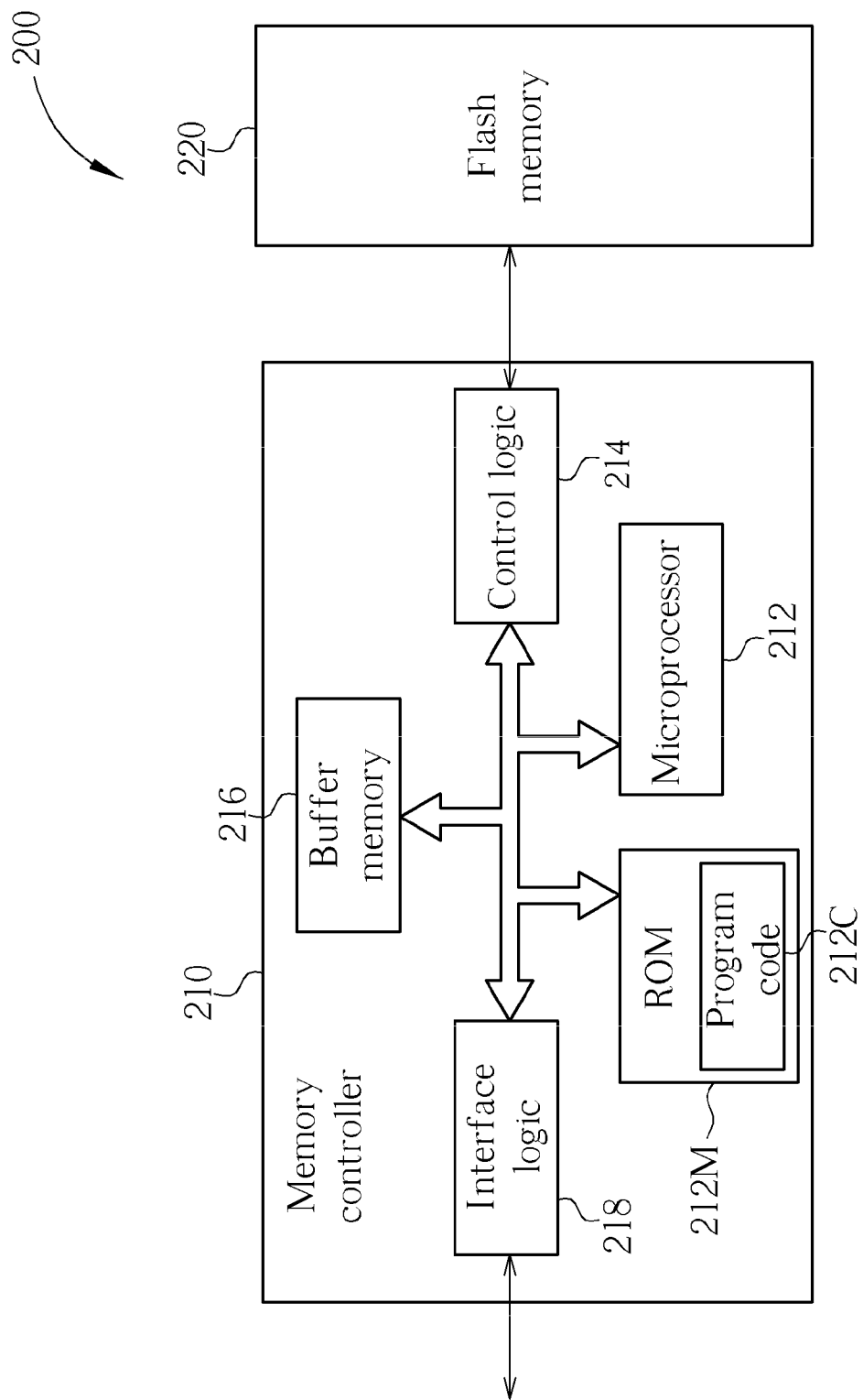
FIG. 2 is a diagram illustrating a memory device according to one embodiment of the present invention.

Please refer to FIG. 2. FIG. 2 is a diagram illustrating a memory device 200 according to one embodiment of the present invention. The memory device 200 of this embodiment can be a portable memory device, such as a memory card complying with SD/MMC, CF, MS, or XD standards. The memory device 200 comprises a flash memory 220, and further comprises a controller arranged to access the flash memory 220, where the aforementioned controller of this embodiment is a memory controller 210. According to this embodiment, the memory controller 210 comprises a microprocessor 212, a read only memory (ROM) 212M, a control logic 214, a buffer memory 216, and an interface logic 218. The ROM 212M is arranged to store a program code 212C, and the microprocessor 212 is arranged to execute the program code 212C to control access to the flash memory 220.

Typically, the flash memory 220 comprises a plurality of blocks, and the controller (e.g. the memory controller 210 that executes the program code 212C by utilizing the microprocessor 212) performs data copying, erasure and combining operations on the flash memory 220 by copying, erasing and combining in units of blocks. In addition, a block can be utilized for recording a specific amount of pages, where the controller (e.g. the memory controller 210 that executes the program code 212C by utilizing the microprocessor 212) performs data writing operations on the flash memory 220 by writing/programming in units of pages.

In practice, the memory controller 210 that executes the program code 212C by utilizing the microprocessor 212 is capable of performing various control operations by utilizing the internal components within the memory controller 210. For example, the memory controller 210 utilizes the control logic 214 to control access to the flash memory 220 (e.g. operations of accessing at least one block or at least one page), utilizes the buffer memory 216 to perform buffering operations for the memory controller 210, and utilizes the interface logic 218 to communicate with a host device.

Figure 3:
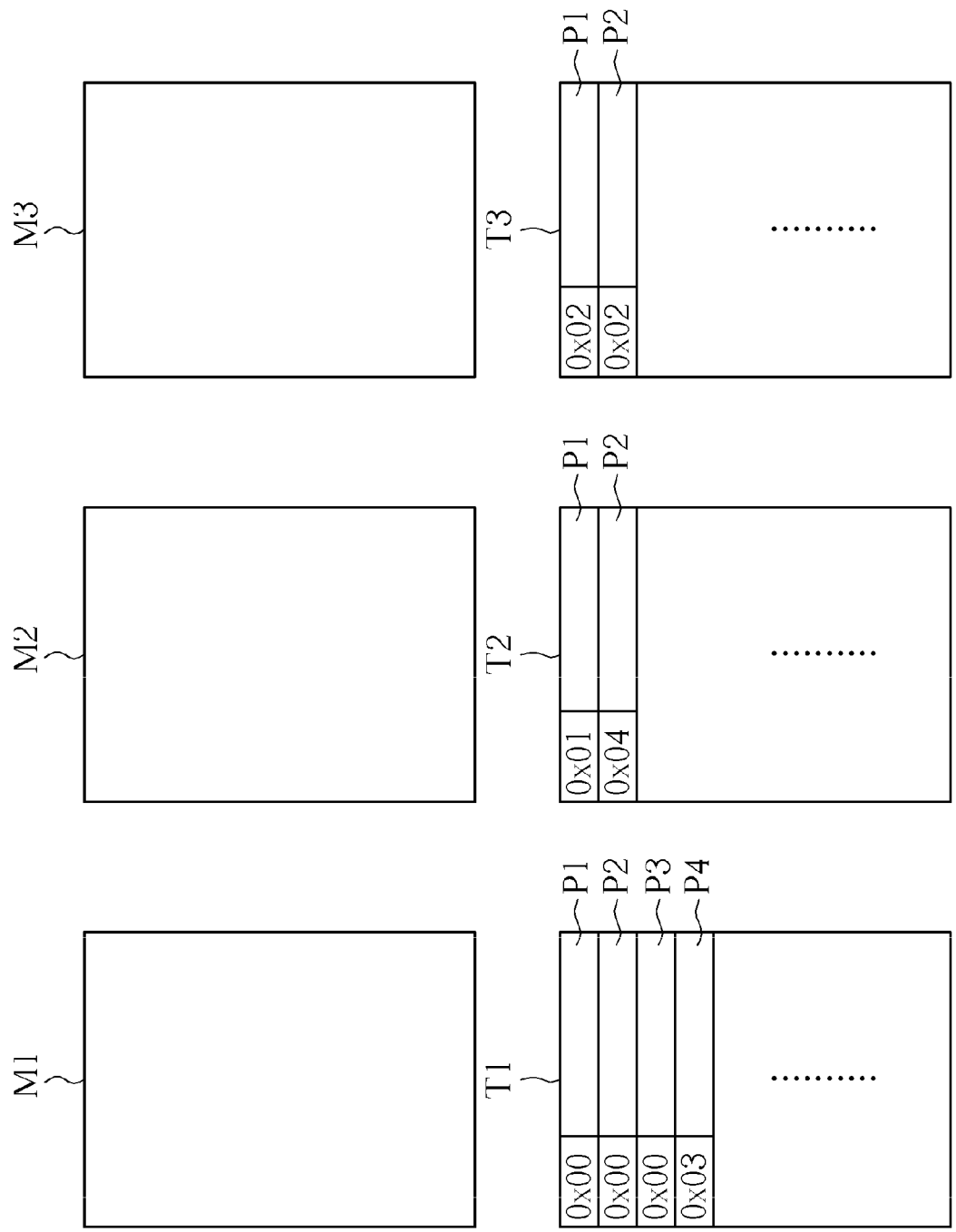
FIG. 3 is a diagram illustrating the memory controller writing a data stream which includes a plurality of updated data from the host device to a plurality of temporary data blocks T1-T3 of the flash memory when parts of data stored in mother data blocks M1-M3 need to be updated according to one embodiment of the present invention.

Please refer to FIG. 2 and FIG. 3 together. FIG. 3 is a diagram illustrating the memory controller 210 writing a data stream which includes a plurality of updated data from the host device to a plurality of temporary data blocks T1-T3 of the flash memory 200 when parts of data stored in mother data blocks M1-M3 need to be updated according to one embodiment of the present invention, where the temporary data blocks T1-T3 are used for storing the updated data of the mother data blocks M1-M3, respectively, and the temporary data blocks T1-T3 and the mother data blocks M1-M3 correspond to the same logical addresses. Referring to FIG. 3, assuming that the first updated data is for mother data block M1, the memory controller 210 writes the first updated data and an identity code "0x00" into pages P1-P3 of the temporary data block T1. Please note that, in one embodiment, each page can be divided into two areas: a data area for storing data and a spare area for storing the identity data such as the identity code of the present invention. Then, assuming that the second updated data is for mother data block M2, the memory controller 210 writes the second updated data and an identity code "0x01" into a page P1 of the temporary data block T2. Then, assuming that the third updated data is for mother data block M3, the memory controller 210 writes the third updated data and an identity code "0x02" into pages P1-P2 of the temporary data block T3. Then, assuming that the fourth updated data is for mother data block M1, the memory controller 210 writes the fourth updated data and an identity code "0x03" into a page P4 of the temporary data block T1. Then, assuming that the fifth updated data is for mother data block M2, n the memory controller 210 writes the fifth updated data and an identity code "0x04" into a page P2 of the temporary data block T2. At this time, when the memory controller 210 is disconnected from a power source during the time the fifth updated data is written into page P2 of the temporary data block T2, the fifth updated data stored in the page P2 may be incomplete.

Figure 4:
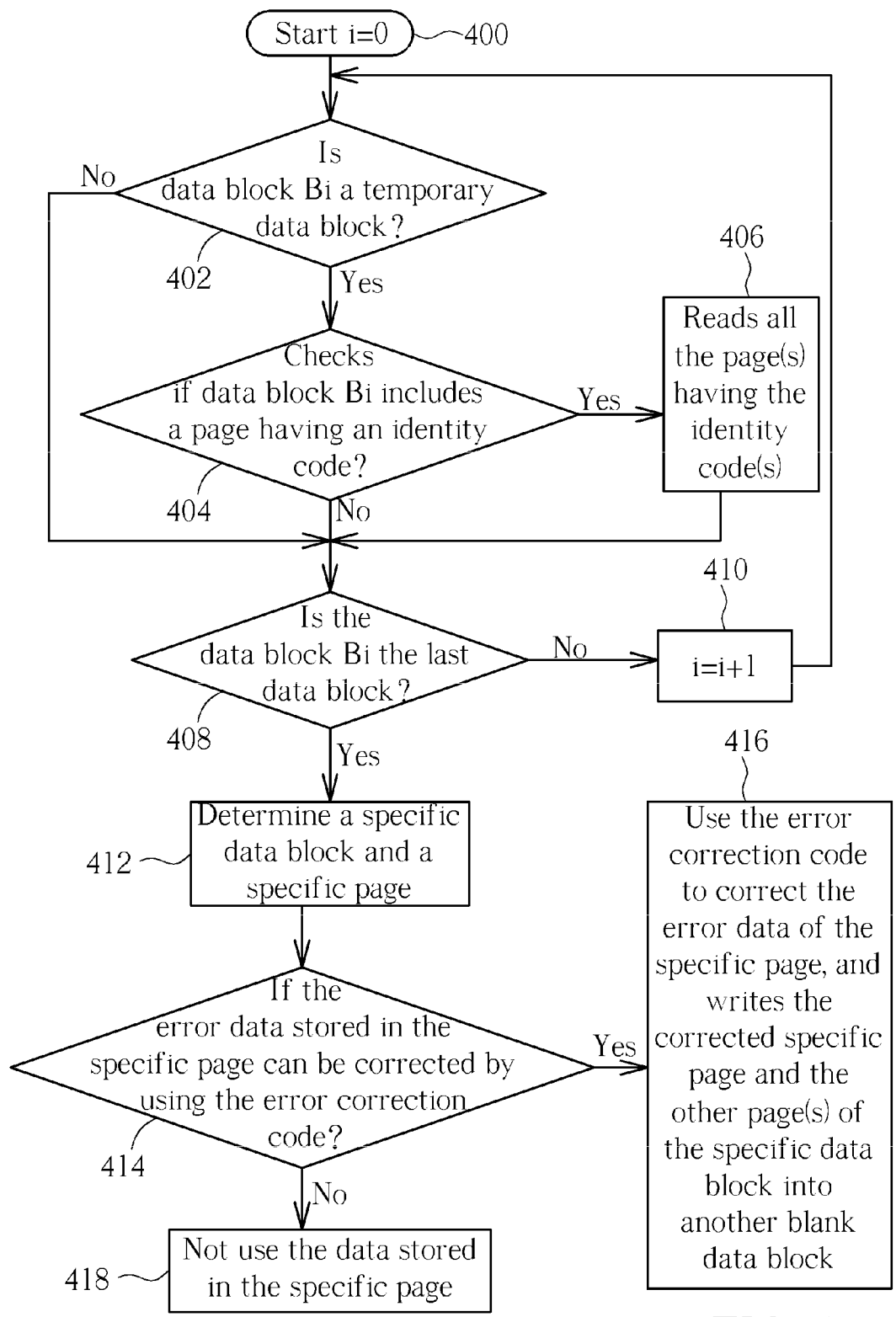
FIG. 4 is a flowchart of accessing the flash memory shown in FIG. 2 according to one embodiment of the present invention.

Therefore, when the memory device 200 is re-connected with the power, the memory controller 210 needs to check the data stored in the flash memory 220 to make sure that the updated data stored in the temporary data blocks T1-T3 are correct. Please refer to FIG. 3 and FIG. 4 together. FIG. 4 is a flowchart of accessing the flash memory 220 according to one embodiment of the present invention. Please note that, provided the results are substantially the same, the steps are not limited to be executed according to the exact order shown in FIG. 4. Referring to FIG. 4, the flow is described as follows:

In Step 400, the process starts. In Step 402, the memory controller 210 determines if a data block Bi of the flash memory 220 is a temporary data block or not (in one embodiment, the memory controller 210 reads the information stored in the spare area of the data block Bi to determine if the data block Bi is a temporary data block or not). If the data block Bi is a temporary data block, the flow enters Step 404; if the data block Bi is not a temporary data block, the flow enters Step 408. In Step 404, the memory controller 210 checks if the data block Bi includes a page having an identity code (i.e., "0x00"-"0x04" shown in FIG. 3). If the data block Bi includes at least one page having the identity code, the flow enters Step 406; if the data block Bi does not include any page having the identity code, the flow enters Step 408. In Step 406, the memory controller 210 reads all the page(s) having the identity code(s), then the flow enters Step 408. In Step 408, the memory controller 210 determines if the data block Bi is a last data block of the flash memory 220. If the data block Bi is not the last data block of the flash memory 220, the flow enters Step 410 and then goes back to Step 402 to determine if a next data block $B_{i+1}$ is a temporary data block or not; if the data block Bi is the last data block of the flash memory 220, the flow enters Step 412 to determine a specific data block and a specific page of the specific data block, where the specific data block is a last data block the data stream is written into while the memory controller 210 is disconnected from the power, and the specific page is a last page the data stream is written into while the memory controller 210 is disconnected from the power. In Step 412, the memory controller 210 compares a plurality of identity codes read from the data blocks, and determines the specific page according to the identity codes.

For simplicity, the above Steps 402-412 are for determining the last page (i.e., the specific page of the specific data block) the data stream is written into when the memory controller 210 is disconnected from the power. Taking the temporary data blocks T1-T3 shown in FIG. 3 as an example, the memory controller 210 compares the identity codes (i.e., "0x00"-"0x04") of the pages of the temporary data blocks T1-T3, and determines the last page the data stream is written into when the memory controller 210 is disconnected from the power according to the identity codes (i.e., "0x00"-"0x04"). In this embodiment, the identity codes are write sequence numbers, therefore, the memory controller 210 determines that the page P2 of the temporary data block T2 is the last page the updated data is written into by determining the page P2 of the temporary data block T2 has a maximum identity code "0x04" (Step 412). In addition, because the memory controller 210 may be disconnected from the power while the memory controller 210 is writing the identity code into the page, the identity code may not be properly written into the page. Therefore, in another embodiment of the present invention, when the memory device 200 is re-connected with the power and a reading error occurs while the memory controller 210 is reading the identity code of a page, the memory controller 210 can determine that this page is the last page the data stream is written into.

After determining the specific data block and the specific page (the last data block and the last page the data stream is written into when the memory controller 210 is disconnected from the power), in Step 414, the memory controller 210 determines if the error data stored in the specific page can be corrected by using the error correction code of the specific page (assuming that there is at least an error data in the specific page). When it is determined that the error data can be corrected, the flow enters Step 416 and the memory controller 210 uses the error correction code to correct the error data of the specific page, and writes the corrected specific page and the other page(s) of the specific data block into another blank data block; when it is determined that the error data of the specific page cannot be corrected, the data stored in the specific page is ignored or cancelled.

Taking the temporary data block T2 shown in FIG. 3 as an example, if the memory controller 210 determines that the error data of the page P2 can be corrected, then the memory controller 210 uses the error correction code of the page P2 to correct the error data of the page P2 of the temporary data block T2, and writes data of the page P1 and data of the corrected page P2 of the temporary data block T2 into a blank data block (not shown); if the memory controller 210 determines that the error data of the page P2 cannot be corrected, the memory controller 210 will not use the data of the page P2 of the temporary data block any more, and may even cancel the data of the page P2.

Figure 5:
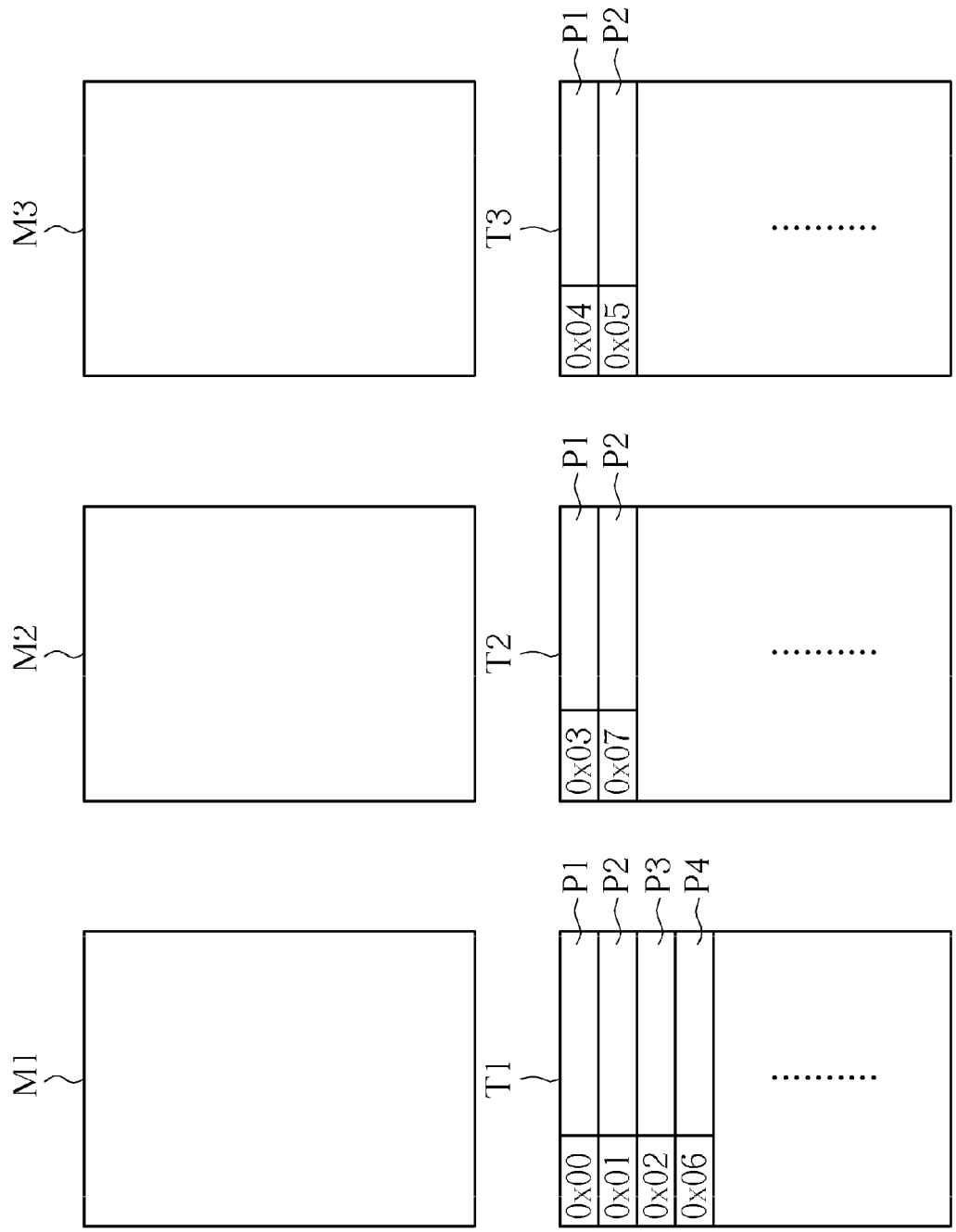
FIG. 5 is a diagram illustrating the memory controller writing a data stream which includes a plurality of updated data from the host device to a plurality of temporary data blocks T1-T3 of the flash memory when parts of data stored in mother data blocks M1-M3 need to be updated according to another embodiment of the present invention.

It should be noted that the identity codes of the pages of the temporary data blocks T1-T3 shown in FIG. 3 are for illustrative purposes only, and in other embodiments of the present invention, types of the identity codes of the pages of the temporary data blocks T1-T3 can be varied according to the designer's considerations. Taking FIG. 5 as an example, when the memory controller 210 writes the first updated data into the pages P1-P3 of the temporary data block T1, the identity codes "0x00", "0x01" and "0x02" are written into the pages P1-P3, respectively, at the same time. Then, the memory controller 210 writes the second updated data into the page P1 of the temporary data block T2, and writes the identity code "0x03" into the page P1. Then, the memory controller 210 writes the third updated data into the pages P1-P2 of the temporary data block T3, and writes the identity codes "0x04" and "0x05" into the pages P1-P2, respectively. Then, the memory controller 210 writes the fourth updated data into the page P4 of the temporary data block T1, and writes the identity code "0x06" into the page P4. Then, the memory controller 210 writes the fifth updated data into the page P2 of the temporary data block T2, and writes the identity code "0x07" into the page P2. For simplicity, as long as the identity codes of the pages of the temporary data blocks T1-T3 can be identified to determine which page is the last page the data stream is written into, the identity codes can be designed to be different types, and these alternative designs all fall within the scope of the present invention.

Figure 6:
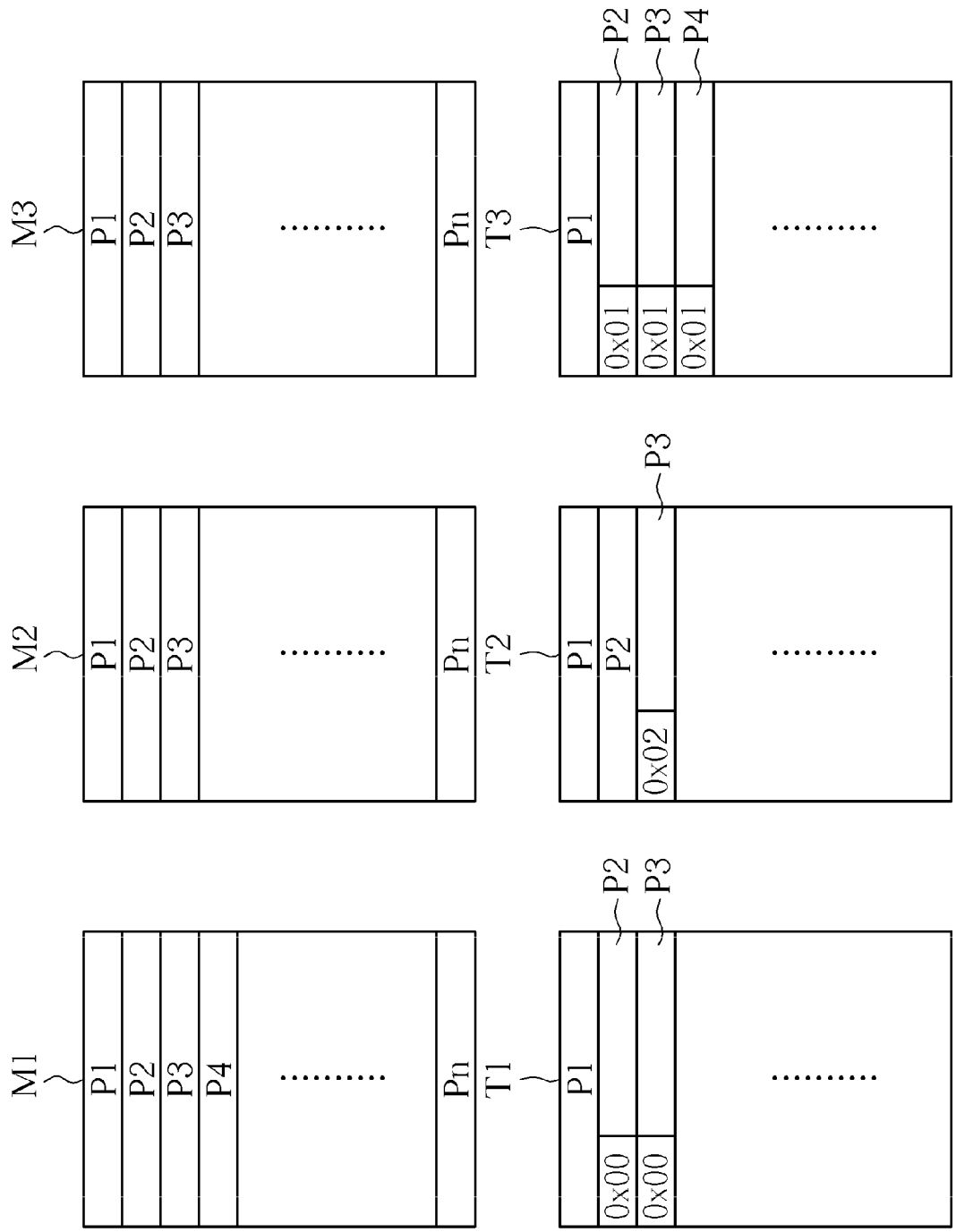
FIG. 6 is a diagram illustrating the memory controller writing a data stream which includes a plurality of updated data from the host device to a plurality of temporary data blocks T1-T3 of the flash memory when parts of data stored in mother data blocks M1-M3 need to be updated according to another embodiment of the present invention.

In addition, in the embodiment shown in FIG. 3, the temporary data block T1-T3 only stores the updated data from the host device. In other embodiments of the present invention, however, the temporary data blocks T1-T3 can also store the data, which does not need to be updated, of the mother data blocks M1-M3. Please refer to FIG. 6. FIG. 6 is a diagram illustrating the memory controller 210 writing a data stream which includes a plurality of updated data from the host device to a plurality of temporary data blocks T1-T3 of the flash memory 200 when parts of data stored in the mother data blocks M1-M3 need to be updated according to one embodiment of the present invention. In addition, in this embodiment, it is assumed that data of pages P2 and P3 of the mother data block M1, data of a page P3 of the mother block N2, and data of pages P2-P4 of the mother block M3 need to be updated. Referring to FIG. 6, assuming that the first updated data is for pages P2 and P3 of the mother data block M1, then the memory controller 210 copies the data of the page P1 of the mother data block M1 to the page P1 of the temporary data block T1, and writes the first updated data and the identity codes "0x00" into the pages P2 and P3 of the temporary data block T1. Then, assuming that the second updated data is for pages P2-P4 of the mother data block M3, then the memory controller 210 copies the data of the page P1 of the mother data block M3 to the page P1 of the temporary data block T3, and writes the second updated data and the identity codes "0x01" into the pages P2-P4 of the temporary data block T3. Then, assuming that the third updated data is for page P3 of the mother data block M2, then the memory controller 210 copies the data of the pages P1 and P2 of the mother data block M2 to the pages P1 and P2 of the temporary data block T2, and writes the third updated data and the identity codes "0x02" into the page P3 of the temporary data block T2, etc. In addition, if the memory device 200 is disconnected from the power when the third updated data is written into the temporary data block T2, a specific data block (the last data block the data stream is written into) and a specific page (the last page the data stream is written into) of the specific data block (Steps 400-412), the memory controller 210 determines if the data stored in the specific page can be corrected by using the error correction code of the specific page (Step 414). The memory controller 210 uses the error correction code to correct the error data of the specific page, and writes the corrected specific page and the other page(s) of the specific data block into another blank data block (Step 416) or ignores or cancels the data stored in the specific page (Step 418).

Briefly summarizing the memory device of the present invention, the memory controller writes a data stream into at least a page of at least one data block of the flash memory, where each page of the data block includes an identity code. Then, the memory controller reads at least one identity code of the page, and determines a specific page according to at least the identity code, where the specific page is the last page where the data stream is written into before the flash memory is disconnected from the power. Finally, when it is determined that the error data of the specific page is correctable, the memory controller 210 uses the error correction code to correct the error data of the specific page, and writes the corrected specific page and the other page(s) of the specific data block into another blank data block. For example, when a reading error occurs while reading an identity code of a page, this page can be determined as the specific page; or when a page has an identity code larger (or smaller) than identity codes of all the other pages, this page can be determined as the specific page; or when a plurality of pages have the same identity codes larger (or smaller) than identity codes of all the other pages, the specific page can be determined according to physical addresses of the above pages having the same identity code, in detail, the specific page can be determined by selecting a page having the greatest physical address among the above pages having the same identity code. According to the method for accessing the flash memory and an associated memory device, it is assured that when the memory device is disconnected from a power source and then re-connected with the power, no vague data error will occur in the page. Therefore, the read error issue can be avoided in the following operations of the memory device.

Those skilled in the art will readily observe that numerous modifications and alterations of the device and method may be made while retaining the teachings of the invention.

What is claimed is:
1. A method for accessing a flash memory, comprising:
 writing a data stream into a plurality of pages of a plurality of data blocks of the flash memory, where for each of the pages, when data is written into the page, simultaneously writing an identity code into the page;
 reading identity codes of the pages; and determining a specific page by comparing the identity codes of the pages of the data blocks, where the specific page is a last page that the data stream is written to before the flash memory is disconnected from a power source.

2. The method of claim 1, wherein the identity codes are write sequence numbers, and each of the write sequence numbers records a sequence of the data stream written into the pages.

3. The method of claim 2, wherein when the data stream is written into a page of a first data block, the method further comprises:
recording a value K as a write sequence number of the page of the first data block;
and when the data stream is written into a page of a second data block, the method further comprises:
recording a value (K+1) or (K-1) as a write sequence number of the page of the second data block.

4. The method of claim 2, wherein the step of determining the specific page by comparing the identity codes comprises:
selecting a maximum write sequence number or a minimum write sequence number as a specific write sequence number; and
determining a page which includes the specific write sequence number as the specific page.

5. The method of claim 4, wherein when more than one pages have the specific write sequence number, the step of determining the page which includes the specific write sequence number as the specific page comprises:
selecting a page which has a maximum physical address among the more than one pages which include the specific write sequence number.

6. The method of claim 2, wherein when the data stream is written into a first page, the method further comprises:
recording a value K as a write sequence number of the first page;
and when the data stream is written into a second page, the method further comprises:
recording a value (K+1) or (K-1) as a write sequence number of the second page.

7. The method of claim 1, further comprising:
utilizing an error correction code of the specific page to determine if error data of the specific page is correctable.

8. The method of claim 7, further comprising:
when it is determined that the error data of the specific page is correctable, correcting the error data of the specific page, and writing corrected error data into a blank data block.

9. The method of claim 8, further comprising:
when it is determined that the error data of the specific page is correctable, writing data of all the other pages of the data block into the blank data block.

10. The method of claim 1, wherein the step of determining the specific page by comparing the identity codes comprises:
when a first page includes an abnormal identity code, designating the first page as the specific page.

11. A memory device, comprising:
a flash memory; and
a controller, for writing a data stream into a plurality of pages of a plurality of data blocks of the flash memory, where for each of the pages, when the controller writes data into the page, the controller simultaneously writes an identity code into the page; for reading identity codes of the pages; and for determining a specific page by comparing the identity codes of the pages of the data blocks, where the specific page is a last page that the data stream is written to before the flash memory is disconnected from a power source.

12. The memory device of claim 11, wherein the identity code are write sequence numbers, and each of the write sequence numbers records a sequence of the data stream written into the pages.

13. The memory device of claim 12, wherein when the data stream is written into a page of a first data block, the controller records a value K as a write sequence number of the page of the first data block; and when the data stream is written into a page of a second data block, the controller records a value (K+1) or (K-1) as a write sequence number of the page of the second data block.

14. The memory device of claim 12, wherein the controller selects a maximum write sequence number or a minimum write sequence number as a specific write sequence number, and determines a page which includes the specific write sequence number as the specific page.

15. The memory device of claim 14, wherein when more than one pages have the specific write sequence number, the controller selects a page which has a maximum physical address among the more than one pages which include the specific write sequence number.

16. The memory device of claim 12, wherein when the data stream is written into a first page, the controller records a value K as a write sequence number of the first page; and when the data stream is written into a second page, the controller records a value (K+1) or (K-1) as a write sequence number of the second page.

17. The memory device of claim 11, wherein the controller is further utilized for utilizing an error correction code of the specific page to determine if error data of the specific page is correctable.

18. The memory device of claim 17, further comprising:
when it is determined that the error data of the specific page is correctable, the controller corrects the error data of the specific page, and writes corrected error data into a blank data block.

19. The memory device of claim 18, further comprising:
when it is determined that the error data of the specific page is correctable, the controller writes data of all the other pages of the data block into the blank data block.

20. The memory device of claim 11, wherein when a first page includes an abnormal identity code, the controller designates the first page as the specific page.

* * * * *